United States Patent [19]

Furuya

[11] Patent Number: 5,035,869

[45] Date of Patent: Jul. 30, 1991

[54] PROCESS FOR REDUCING URANYL SALT

[75] Inventor: Nagakazu Furuya, No. 4-3-31, Ohte 2-chome, Kofu-shi, Yamanashi, Japan

[73] Assignees: Tanaka Kikinzoku Kogyo K.K.; Nagakazu Furuya, both of Japan

[21] Appl. No.: 614,272

[22] Filed: Nov. 16, 1990

[30] Foreign Application Priority Data

Nov. 16, 1989 [JP] Japan .................................. 1-298698

[51] Int. Cl.[5] .............................................. C01G 43/00

[52] U.S. Cl. ........................................ 423/253; 423/3; 204/1.5; 204/86; 204/91

[58] Field of Search ...................... 423/3, 253; 204/1.5, 204/86, 91

[56] References Cited

U.S. PATENT DOCUMENTS 2,650,153 8/1953 Ellis et al. ........................... 423/253

3,878,060 4/1975 Kroebel ................................ 204/1.5

4,693,795 9/1987 Eccles et al. .......................... 204/94

*Primary Examiner*—Brooks H. Hunt

*Assistant Examiner*—Ngoclan Mai

*Attorney, Agent, or Firm*—Klauber & Jackson

[57] ABSTRACT

A process for reducing an uranyl salt solution to an uranous salt solution employing a gas diffusion membrane comprising a reaction layer and a gas supply layer. The uranyl salt solution can be reduced to the corresponding uranous salt solution in the reaction layer of the membrane by a hydrogen gas supplied from the gas supply layer with the reduced power consumption.

3 Claims, 5 Drawing Sheets

PROCESS FOR REDUCING URANYL SALT

BACKGROUND OF THE INVENTION

The present invention relates to a process for obtaining an uranous salt solution by electrolytically reducing an uranyl salt solution.

One of the conventional processes for obtaining an uranous salt is as follows.

Uranium mineral concentrate is dissolved in sulfuric acid or hydrochloric acid and is purified by means of a solvent extraction method to obtain a solution of uranyl sulfate $UO_2SO_4$ or uranyl chloride $UO_2Cl_2$. These uranyl salts are then electrolytically reduced to the corresponding uranous salts in an aqueous solution.

In this method, a platinum-plated titanium plate and a titanium plate are employed as an anode and a cathode, respectively, and both electrolytes are divided by a cation exchange membrane.

The uranyl salt is reduced to the uranous salt on the cathode at a current density of about 120 mA/cm$^2$, and oxygen generation occurs on the anode so that the cell voltage is as high as over 4 V.

As mentioned before, the conventional method has a disadvantage that the electric energy required for the electrolytic reduction is quite high.

SUMMARY OF THE INVENTION

The present invention has been made to overcome the disadvantage of the conventional method.

An object of the present invention is to provide a process for electrolytically reducing an uranyl salt solution to an uranous salt solution.

Another object of the invention is to provide a process for reducing an uranyl salt solution to an uranous salt solution with reduced energy consumption by employing a gas diffusion membrane.

One aspect of the present invention is a process for obtaining an uranous salt solution by reducing an uranyl salt solution which comprises reducing an uranyl salt to an uranous salt by supplying an uranyl salt solution to a reaction layer side of a gas diffusion membrane comprising the reaction layer which comprises a hydrophilic portion supported with a platinum group catalyst and a hydrophobic portion and a gas supply layer containing hydrophobic pores, and supplying a hydrogen gas from the gas supply layer side.

Another aspect of the invention is a process for reducing an uranyl salt in which a metal mesh coated with a catalyst is inserted in the gas supply layer of the gas diffusion membrane and another metal mesh is added to the reaction layer side, the two metal meshes being connected by a leading wire.

According to this invention, the uranyl salt solution can be reduced to the uranous salt solution employing the gas diffusion membrane and the hydrogen-uranyl ion local cell in a considerably simpler apparatus compared to a conventional electrolyzing method. By connecting the two metal meshes, preferably a platinum mesh and a titanium mesh coated with ruthenium oxide, inserted in the gas supply layer of the gas diffusion membrane by means of the leading wire, the reduction rate can be more than four times and also the electric power can be recovered. Accordingly, the present invention possesses a large effect to the reduction of production cost and the like.

DETAILED DESCRIPTION OF THE INVENTION

Figure 1:
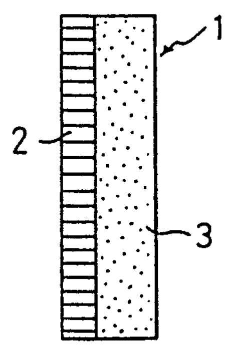
FIG. 1 is an enlarged sectional schematic view of a gas diffusion membrane.

According to the process of this invention, an uranyl ion in the reaction layer is reduced to an uranous ion according to Equation (1). Electromotive force ($E_o$) of Equation (1) is 0.33 V.

$$UO_2^{2+}+H_2+2H^+=U^{4+}+2H_2O \quad (1)$$

When this equation is modified for the respective cathode and anode reactions, the uranyl ion is reduced to the uranous ion on the cathode and the oxidation reaction of the hydrogen proceeds on the anode.

$$UO_2^{2+}+4H^++2e=U^{4+}+2H_2O \quad (2)$$

$$H_2=2H^++2e \quad (3)$$

The rate of formation of the uranous ion is determined by the value of current I delivered from the anode reaction (3) to the cathode reaction (2).

The larger the current value I is, the more excellent the performance of the local cell is. One of the methods for elevating the performance is closely adhering a metal mesh, preferably a platinum mesh, to the reaction layer side of the gas diffusion membrane contacting the uranyl salt solution. Another is inserting a metal mesh coated with a catalyst (for example, a Ti mesh coated with $RuO_2$) in the gas supply layer of the gas diffusion membrane to make the mesh a current collector, providing a metal mesh, preferably a platinum mesh, in the uranyl salt solution and connecting the Ti mesh coated with $RuO_2$ and the platinum mesh by a leading wire. When the performance is elevated, the reduction rate becomes faster.

The gas diffusion membrance employed in this invention comprises a reaction layer which comprises a hydrophilic portion supported with a platinum group catalyst and a hydrophobic portion, and a gas supply layer containing hydrophobic pores. As is exemplified in FIG. 1, the gas diffusion membrane 1 may be a filmy body consisting of a reaction layer 2 and a gas supply layer 3. The reaction layer 2 may be formed by hydrophobic carbon black and hydrophilic carbon black having an average particle size of preferably around 420 Å, polytetrafluorethylene (hereinafter referred to as "PTFE") having an average particle size of preferably around 0.3 μm and solvent naptha. The mixing ration may be around 7:4:4:20. After the mixture is compression-molded, it is heat-dried at preferably around 280° C. for solvent removal to prepare the reaction layer 2. Further, a platinum group metal or its compound, for example, a platinum black (average particle size: about 50 Å) film having a thickness of less than 0.1 mm may be formed on the layer 2.

The carbon black may be employed in the reaction layer 2 for producing conductivity as an electrode. The hydrophilic carbon black is employed in the reaction layer 2 for elevating wettability with the uranyl salt solution. The hydrophobic carbon black can prevent the leakage of the said solution without damaging the performance as a membrance. PTFE may be added for generating moderate hydrophobicity.

The platinum group metal may be uniformly dispersed and it is added for promoting an oxidation-reduction reaction and providing electronic conduction. The gas supply layer 3 is a membrane having hydrophobic pores of which a diameter is not more than 0.1 μm. The layer 3 is prepared by, for instance, mixing hydrophobic carbon black having an average particle size of preferably around 420 Å, PTFE having an average particle size of preferably around 0.3 μm and solvent naphtha as a solvent in the mixing ratio of preferably around 0.5 mm and heat-drying it at preferably around 280° C. for solvent removal.

The hydrophobic carbon black and PTFE are desirably employed in the gas supply layer 3 for preventing the leakage of the solution. The pores are provided for elevating gas permeability.

The gas diffusion membrane 1 may be formed by joining the reaction layer 2 and the gas supply layer 3, and the gas supply layer may be reinforced. For instance, the gas diffusion membrane may be put between a pair of metal meshes coated with acid-resistant resin and fixed.

Figure 2:
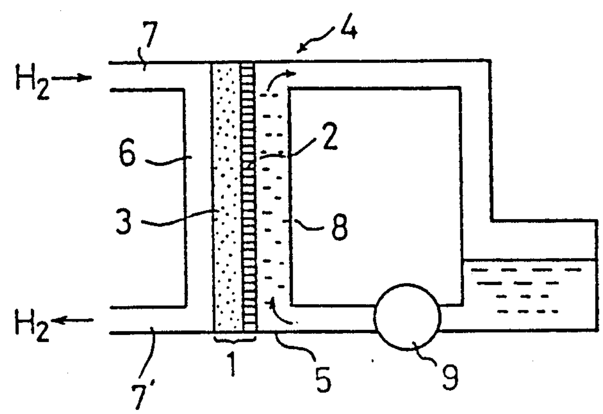
FIG. 2 is a sectional schematic view of a reduction apparatus.

FIG. 2 is a sectional schematic view of a reduction apparatus of an uranyl salt solution employing the above-prepared gas diffusion membrane.

A reduction apparatus 4 may consist of a solution chamber 5 and a gas supply chamber 6 separated by a gas diffusion membrance 1, and a gas supply port 7 and a discharge port 7'.

An uranyl salt solution 8 may be composed of an uranyl salt, an acid and water. The concentration of the uranyl salt is preferably adjusted to contain about 300 g/l of uranium. The concentration of the acid is preferably 1 to 4 mol/l, and when the acid is nitric acid or a similar acid, the concentration of hydrazine may be 10 to 20 g/l, and a hydrogen gas is supplied through the gas supply port 7 during the reduction for performing the reduction.

The reduction reaction can take place as a hydrogen-uranyl ion local cell employing the chemical energy of the hydrogen gas. The hydrogen gas supplied enters into the gas chamber 6 and permeates the gas supply layer 3 of the gas diffusion membrane 1 to get in contact with the reaction layer 2. The uranyl ion in the reaction layer is reduced to the uranous ion according to Equation (1).

An ion exchange member (for example, liquid Nafion) may be applied to the reaction layer of the gas diffusion membrance and an ion exchange layer may be formed on the surface of the reaction layer in this invention.

By inserting a diaphragm therebetween, it can act as a cell.

The present invention will now be described in detail in connection with the following Example. However, the Example is not intended to restrict the scope of the present invention.

EXAMPLE

The hydrophilic portion of a reaction layer was prepared by mixing and dispersing hydrophilic carbon black AB12 (trial manufacture of Denki Kagaku Kogyo K. K.) and PTFE dispersion (manufactured by Daikin Kogyo K. K., D-1) in the weight of ration AB12:PTFE=72.5:27.5 (raw material powder a).

The hydrophobic portion was prepared by mixing and dispersing hydrophobic carbon black (AB7, trial manufacture of Denki Kagaki Kogyo K. K.) and PTFE in the weight ratio of AB7:PTFE=6.5:3.5 (raw material powder b).

These were mixed and dispersed in the mixing ration of (raw material a):(raw material powder b)=7:3 to prepare raw material powder for the reaction layer.

The hydrophobic carbon black (AB7) and PTFE (composition; AB7:PTFE=6.5:3.5) were mixed and dispersed to prepare raw material powder for the gas supply layer.

The raw material powder for the reaction layer and that for the gas supply layer were shaped as a layer and a Ti mesh coated with $RuO_2$ was inserted in the gas supply layer as a current collector. The raw material powder was hot-pressed at 380° C and 600 $kg/cm^2$ to obtain a gas diffusion membrane. Platinum was supported as a catalyst on the reaction layer at the rate of 0.56 $mg/cm^2$.

Figure 3:
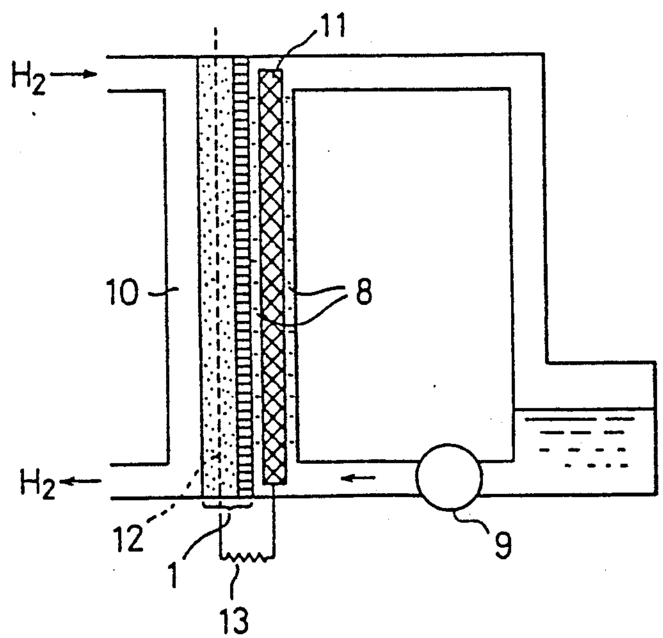
FIG. 3 is a sectional view of an experimental apparatus.

FIG. 3 is a sectional view of an experimental apparatus which was employed in this Example for reducing an uranyl salt solution to an uranous salt solution.

A reaction chamber was rectangle and made of acryl resin. An effective area of the reaction layer 2 of the gas diffusion membrane 1 which was in contact with the uranyl salt solution 8 was 50 $cm^2$. 100 ml of the uranyl salt solution 8 which contained 350 $g/dm^3$ of uranyl nitrate and 3 $mol/dm^3$ of nitric acid was supplied therein. 0.35 $mol/dm^3$ of hydrazine was added as a stabilizer.

The solution 8 was circulated by a pump 9. After a hydrogen gas was supplied to a gas chamber 10 of the apparatus, the change of the ion concentration and the change of potential of the gas diffusion membrane 1 were measured.

The analysis of the uranyl ion and the uranous ion was performed according to an absorptiometric method, and the wavelengths used in the measurement were 416 nm and 627 nm. Potentials were measured under the liquid junction by an agar salt bridge containing 3 M $KNO_3$ employing a hydrogen electrode (0.5 M $H_2SO_4$) as a reference electrode.

The mesh size of a platinum mesh 11 was 50 mesh, and the surface area was 40 $cm^2$. The platinum mesh 11 was opposite to the gas diffusion membrane 1 and was connected with a titanium mesh coated with ruthenium oxide of the gas diffusion membrane 1 through a resistance of 0.001 ohm.

The gas diffusion membrane 1 was incorporated in an experimental apparatus in which a solution containing 350 $g/dm^3$ of uranyl nitrate and 3 $mol/dm^3$ of nitric acid was supplied and a hydrogen gas was supplied to a gas chamber. Then the color change of the solution occurred and the uranyl ion was reduced to the uranous ion.

As a result of the analysis, the amount of the uranyl ion decreased was fair agreement with the amount of uranous ion increased. Since the logarithm of the uranyl ion concentration is linear to the time as shown in FIG. 4, the diffusion of the uranyl ion is a rate-determining step.

Figure 4:
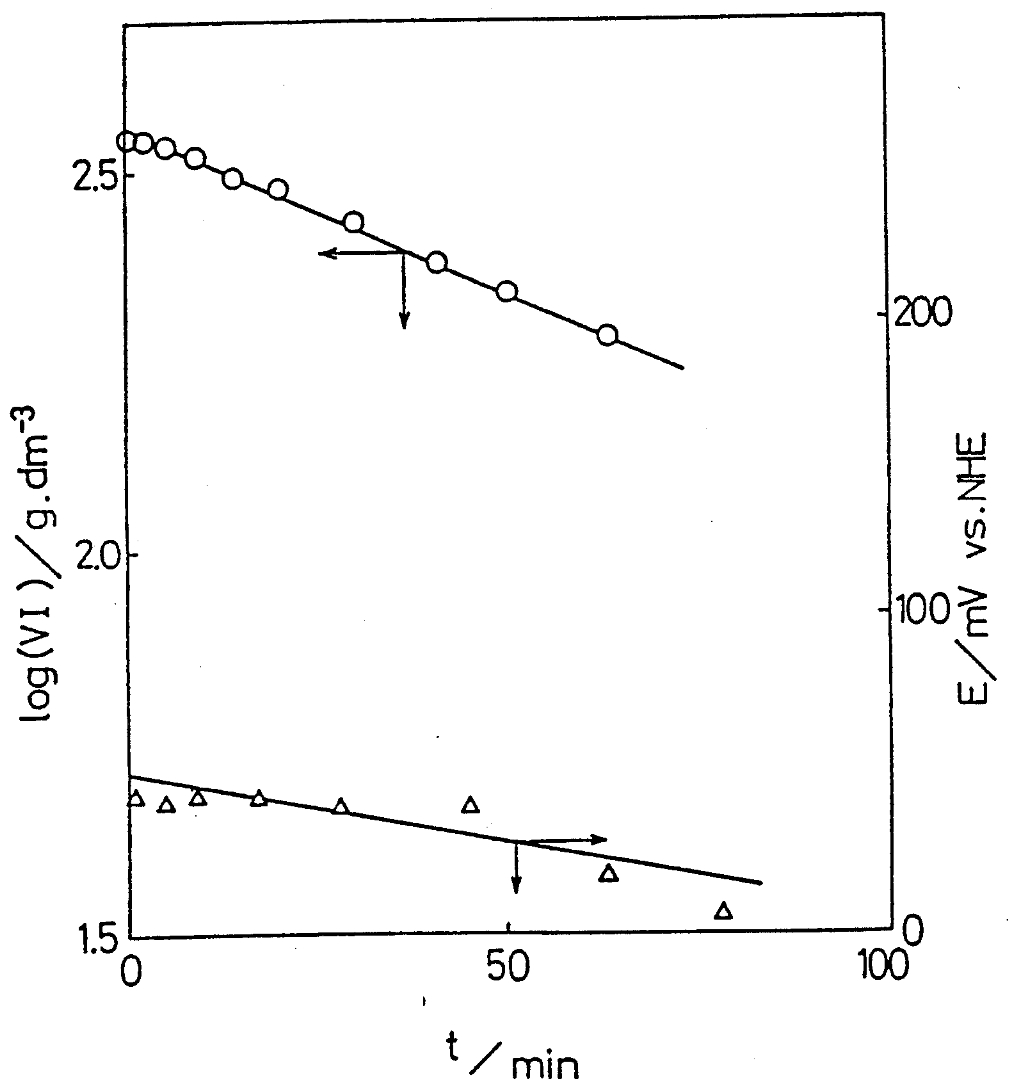
FIG. 4 is a graph showing a relation of the concentration of an uranyl ion and a reaction time and a relation of the potential change of a gas diffusion membrane and a reaction time.

The potential change of the gas diffusion membrane is shown in the lower part of FIG. 4.

Since the electrode potential which was 50 mV is close to the hydrogen potential, it is found that the electrode of the hydrogen oxidation reaction is not so polarized.

It is confirmed that when the platinum mesh was set opposite to the gas diffusion membrane and the solution containing 350 $g/dm^3$ of uranyl nitrate and 3 $mol/dm^3$ of nitric acid was supplied and a hydrogen gas was supplied to a gas chamber with agitation, the platinum mesh and the gas diffusion membrane were confirmed to act as a local cell judged from the potential generated on the standard resistance of 0.001 ohm connected between the gas diffusion membrane and the platinum mesh.

Figure 5:
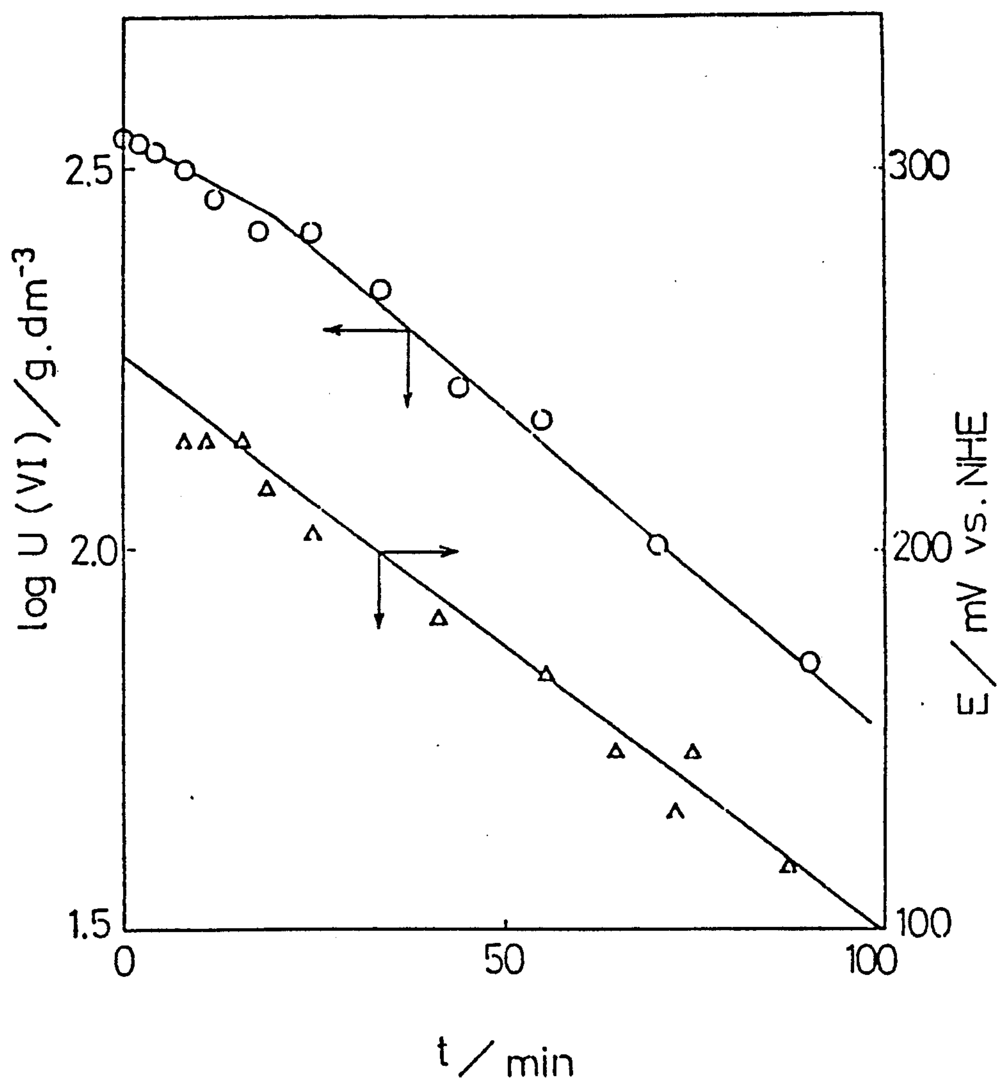
FIG. 5 is a graph showing a relation of the concentration change of the uranyl ion and a reaction time and a relation of the potential change of the gas diffusion membrane and a reaction time.

FIG. 5 shows a relation of the logarism of the uranyl ion concentration to the reaction time as a result of the above experiment..

Also shown in the lower part of FIG. 5 is the potential change of the gas diffusion membrane.

The potential of the gas diffusion membrane is 250 mV at the beginning and gradually decreases.

The potential is shifted to a higher side compared with that of only the gas diffusion membrane.

Figure 6:
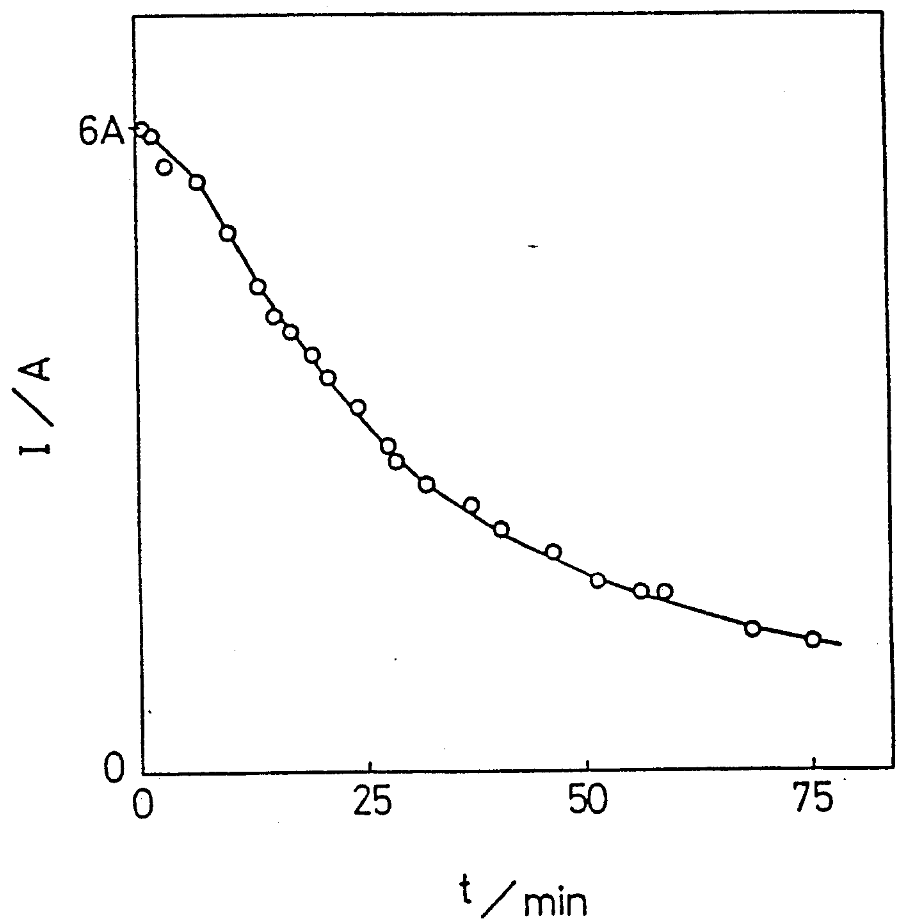
FIG.6 is a graph showing the change of a current flown in the platinum mesh and the gas diffusion membrane depending on time.

FIG. 6 shows the change of a current depending on time flowing between the platinum mesh and the gas diffusion membrane.

The platinum mesh acts as a reduction electrode of the uranyl ion.

The initial current was as high as 6 A, and the current decreased with time. The curve of the current closely resembles the decreasing curve of the uranyl ion.

Figure 7:
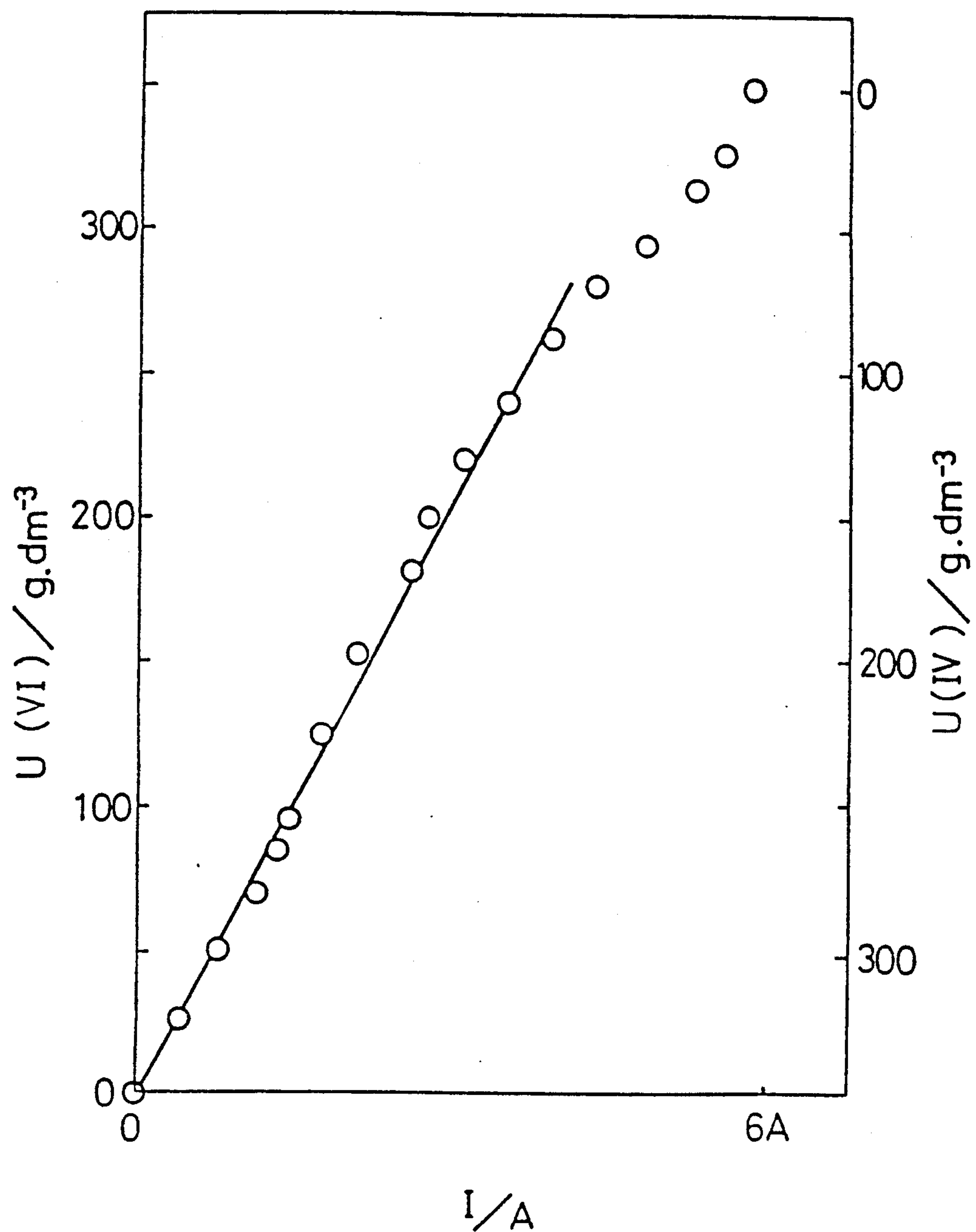
FIG. 7 is a graph showing a relation of the current value flown in the platinum mesh and the gas diffusion membrane, and the concentration of an uranous ion.

FIG. 7 shows a relation of the current value between the platinum mesh and the gas diffusion membrane, and the concentration of the uranous ion.

Since the curve deviates from a straight line for 20 minutes from the beginning of the reaction, the diffusion is not time-determining in this stage. The concentration of the uranous ion produced is proportional to the current value flowing in the gas diffusion membrane after lapse of 20 minutes so that it is apparent that the diffusion of the uranyl ion is a rate-determining step.

The concentration of the uranous ion is scaled on the right hand ordinate of the graph of FIG. 7. The concentration of the uranous ion can be detected employing the value of a current flowing in the platinum mesh and the gas diffusion membrane without the analysis by a spectrophotometer or the like.

It is found from the foregoing that the reduction rate of the uranyl ion employing the apparatus with the platinum mesh is faster than that employing the apparatus without the platinum mesh.

While the invention has been particularly set forth in terms of the specific embodiments thereof, it will be understood in view of the instant disclosure that numerous variations upon the invention are now enabled to those skilled in the art, which variations yet reside within the scope of the present teaching. Accordingly, the invention is to be broadly construed, and limited only by the scope and spirit of the claims appended hereto.

What is claimed is:

1. A process for obtaining an uranous salt solution by reducing an uranyl salt solution which comprises reducing an uranyl salt to an uranous salt by supplying an uranyl salt solution to a reaction layer side of a gas diffusion membrane comprising the reaction layer which comprises a hydrophilic portion supported with a platinum group catalyst and a hydrophobic portion and a gas supply layer containing hydrophobic pores, and supplying a hydrogen gas from the gas supply layer side.

2. The process claimed in claim 1, wherein a metal mesh coated with a catalyst is inserted in the gas supply layer of the gas diffusion membrane and another metal mesh is added to the reaction layer side, the two metal meshes being connected by a leading wire.

3. The process claimed in claim 2, wherein the metal mesh coated with the catalyst is a titanium mesh coated with ruthenium oxide, and another mesh is a platinum mesh.

* * * * *